D. F. FESLER.
LUBRICATING SYSTEM.
APPLICATION FILED NOV. 18, 1918.
1,387,843.
Patented Aug. 16, 1921.
2 SHEETS—SHEET 2.
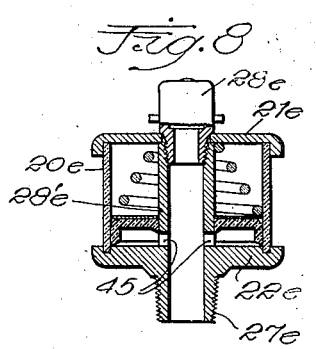
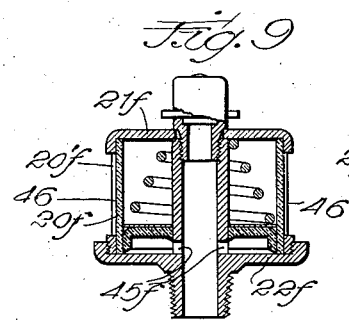
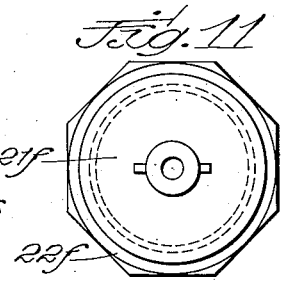
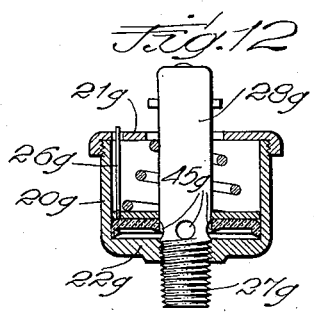
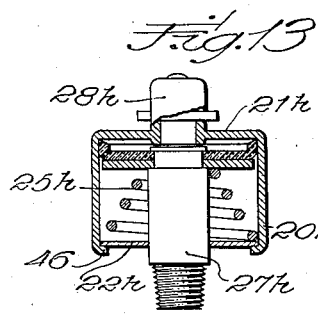
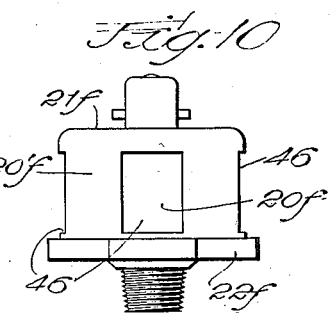
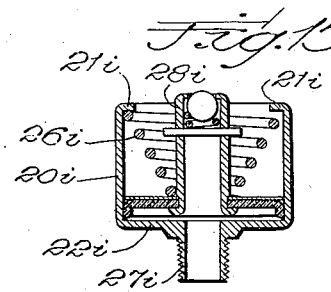
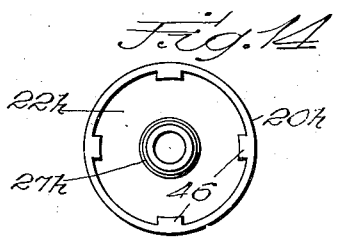

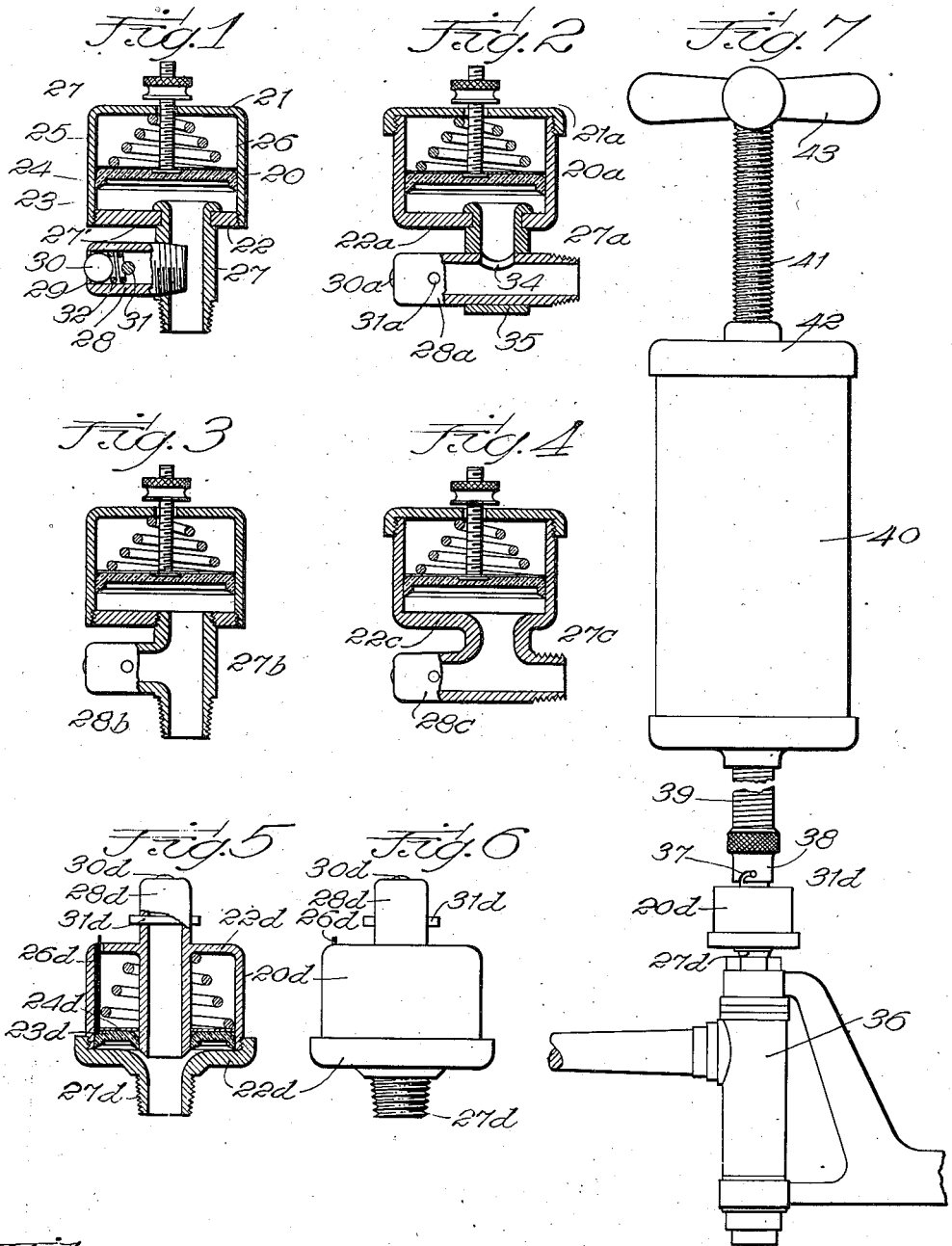

UNITED STATES PATENT OFFICE.

DOUGLAS F. FESLER, OF EVANSTON, ILLINOIS, ASSIGNOR, BY MESNE ASSIGNMENTS, TO THE BASSICK MANUFACTURING COMPANY, A CORPORATION OF DELAWARE.

LUBRICATING SYSTEM.

1,387,843.     Specification of Letters Patent.     Patented Aug. 16, 1921.

Application filed November 18, 1918. Serial No. 262,930.

*To all whom it may concern:*

Be it known that I, DOUGLAS F. FESLER, a citizen of the United States, residing at Evanston, in the county of Cook and State of Illinois, have invented a certain new and useful Improvement in Lubricating Systems, of which the following is a full, clear, concise, and exact description, reference being had to the accompanying drawings, forming a part of this specification.

My invention relates to lubricating systems and is especially concerned with means for supplying lubricant under pressure to bearings or other surfaces to be lubricated. My invention comprises means for initially supplying a quantity of lubricant under high pressure to the surfaces to be lubricated and thereafter supplying lubricant to said surfaces at a considerably reduced but continuous pressure.

The objects of my invention are—

First: To provide apparatus for performing the above functions comprising in general a grease cup having a plunger therein, a spring confined between one end of the grease cup and the plunger, means for supplying lubricant under pressure to the space between the other side of the plunger and the opposite end of the grease cup, and means for conducting lubricant from said space to the bearing or surfaces to be lubricated, the means for supplying lubricant to said space under pressure comprising a grease pump or "gun" having a discharge nozzle and means for detachably connecting the discharge nozzle of the grease gun with the grease cup;

Second: To provide a system of the character described in which means is provided for supporting the plunger against the pressure of the lubricant when the grease cup is completely filled by lubricant under pressure, so that additional pressure can be exerted upon the lubricant in order to force the lubricant into the bearing with which the grease cup is connected under an extremely high pressure in order to insure a supply of lubricant to every point of contact of the bearing;

Third: To provide a grease cup of novel construction forming a part of the above described system, which is simple in construction and economical to manufacture; and Fourth: To provide a grease cup of the type described having means for indicating the amount of lubricant which it contains.

Other objects will appear as the description progresses, reference being had to the accompanying drawings in which—

Figure 1 is a central longitudinal section through one form of a grease cup constructed in accordance with my invention.

Fig. 2 is a similar view of another form of my invention.

Fig. 3 is a central transverse section through another modification, portions being shown in elevation.

Fig. 4 is a view similar to Fig. 3 of another form of my invention.

Fig. 5 shows a still further form of my invention in central longitudinal section, a part thereof being shown in elevation.

Fig. 6 is a side elevation of the grease cup shown in Fig. 5.

Fig. 7 is an elevation showing my improved lubricating system comprising a grease cup, a grease gun detachably connected therewith, the grease cup being connected with the knuckle of a steering gear for an automobile.

Figs. 8 and 9 are central longitudinal sections of two further modifications of my invention.

Fig. 10 is a side elevation of the modification shown in Fig. 9.

Fig. 11 is a plan view of the construction shown in Fig. 9.

Figs. 12 and 13 are longitudinal sections partially in elevation showing still further modifications of my invention.

Fig. 14 is a bottom view of the structure shown in Fig. 13.

Fig. 15 is a central longitudinal section of another modification.

Throughout the several views similar reference characters refer to similar parts.

My improved lubricating system is primarily designed to be used in connection with engine driven vehicles and other similar structures, but its use is not in any sense restricted to this field. So far as I know automobiles and other similar vehicles are universally equipped with grease cups of various types by means of which lubricant can be forced into the bearings under a comparatively low pressure, this pressure continuing as long as the force which is applied to the grease cups is continued and ceasing shortly thereafter, due to the fact that the lubricant is practically incompressible and since after the bearing has taken up a slight amount of the lubricant from the grease cup, the pressure therein is relieved, unless, by chance, the lubricant should contain bubbles of air which have been put into compression during the adjustment of the grease cup closure.

Due to the fact that it is practically impossible to obtain anything more than very moderate pressures by means of the grease cups now in use, it is the custom among vehicle manufacturers to make the bearings as loose as possible in order that the resistance to the lubricant will be as small as possible, so as to insure as far as possible an adequate supply of lubricant to the bearings. There is consequently considerable play between the members of the bearings, which causes rapid wearing of these parts and more or less noise during operation. Furthermore, a big percentage of the lubricant passes through these loose bearings without performing any useful function and is lost; and besides, the lubricant in passing through the bearings takes the course of least resistance and consequently does not touch the portions of the bearings which are in contact, but merely passes between those portions of the bearings which are spaced farthest apart.

It is the purpose of my invention to overcome the above objectionable features of the usual lubricating systems by providing a system by means of which lubricant can be supplied to the bearings under very high pressures, several hundred pounds, if necessary, for I have found that with these high pressures it is possible to tighten up the various bearings so that resistance to the passage of the lubricant between the parts of the bearings is substantially equal on all sides and causes a uniform distribution of the lubricant to all parts of the bearings. By using a lubricating system of this character the bearings can be tightened, the loose play eliminated and the wear incident thereto greatly reduced. The vehicle will operate less noisily and less lubricant is required than with the systems heretofore employed.

In Fig. 1 I have illustrated one form of the grease cup which forms a part of my lubricating system. This cup comprises a cylinder 20, the upper end 21 of which is formed integrally therewith, and the lower end of which is closed by a disk 22 having screwthreaded engagement with the inner wall of the cylinder. A plunger formed of the cup leather 23 and the follower 24 is slidably mounted in the cylinder and is urged toward the lower end thereof by means of a spiral spring 25, one end of which bears against the end 21 of the cylinder and the other end of which bears against the adjacent face of the follower 24. A screw-threaded indicator pin 26 is secured to the follower 24 and projects upwardly through an opening 27 in the end 21 of the cylinder. The extent to which the end of this indicator pin projects beyond the end 21 of the cylinder indicates the amount of lubricant in the cylinder. A thumb nut 26' is tightly threaded upon the end of the indicator pin 26 and may be adjusted toward the free end of the pin to determine the amount of lubricant which is to be fed to the bearing at any one time. The end 22 of the cylinder is provided with an opening through which the reduced end of the screwthreaded tubular member 27' is extended and swaged over, as shown at 27', to secure it to the cylinder. A second screwthreaded tubular member 28 projects and has screwthreaded engagement with the edges of an opening in one wall of the tube 27. The outer end of the tubular member 28 is flanged over, as shown at 29, to form a valve seat for the ball-valve 30. A pin 31 extends through both walls of the tubular member 28 and projects therefrom in the same manner that the pin $31^d$ projects from both walls of the tubular member $28^d$ in Fig. 5. The purpose of this construction will be referred to later on. A spring 32 confined between the ball-valve 30 and the pin 31 urges the ball-valve toward its seat.

In the embodiment of my invention shown in Fig. 2 the lower end $22^a$ of the cylinder $20^a$ is formed integrally therewith, and the upper end $21^a$ is in the form of a flanged cup which has screwthreaded engagement with the outer side of the cylinder $20^a$. This cup is provided with a spring operated plunger similar in all respects to that disclosed in Fig. 1 and need not, therefore, be described in detail. A tubular member $27^a$ is secured to the end $22^a$ of the cylinder in the same manner in which the tubular member 27 is secured to the end 22 in the cylinder shown in Fig. 1. The lower end of the member is closed as shown at 35 and it is provided with a transverse opening for receiving the tubular member $28^a$ which is provided with a pin $31^a$ and a ball-valve $30^a$ similar in all respects to that disclosed in Fig. 1. The tubular member $28^a$ has an opening 34 formed in one wall thereof, which registers with the bore of the tubular member $27^a$, so as to establish communication between the tubular members $27^a$ and $28^a$.

The structure disclosed in Fig. 3 is similar in all respects to that disclosed in Fig. 1 except that the tubular members $27^b$ and $28^b$ are formed integrally with each other, and similarly the structure disclosed in Fig. 4 is similar to that disclosed in Fig. 2 except that the tubular members $27^c$ and $28^c$ are formed integrally with each other and the tubular member 27ᶜ is formed integrally with the end 22ᶜ of the cylinder.

In Fig. 5 I have shown a somewhat different construction in which the end 22ᵈ of the cylinder 20ᵈ has integrally formed therewith the tubular member 28ᵈ, by means of which lubricant is supplied to the cylinder. It will be noted that the tubular member 28ᵈ extends to a position adjacent the bottom of the cylinder 20ᵈ and that the plunger formed by the cup leather 23ᵈ and the follower 24ᵈ is provided with a central opening for slidably receiving the lower end of the tubular member 28ᵈ. The end 22ᵈ of the cylinder is provided with a flange having screwthreaded engagement with the lower end of the cylinder 20ᵈ and also has a tubular member 27ᵈ formed integrally therewith. This cup is provided with a ball-valve 30ᵈ and a pin 31ᵈ similar in all respects to the corresponding elements in the cups described. It is also provided with an indicator pin 26ᵈ which extends through an opening in the end 22ᵈ to indicate the amount of lubricant in the cylinder.

In Fig. 7 I have disclosed my lubricating system as applied to the steering knuckle of an automobile or other engine driven vehicle. It is my purpose to provide each of the bearings of a vehicle with an oil cup similar to one of those described above, or which will be described later on, and to provide a grease cup having means by which the discharge nozzle thereof can be detachably connected with the grease cup, so that the grease gun can be successively secured to each of the oil cups and lubricant under high pressure supplied thereto to completely fill the grease cup, and also to supply each bearing with fresh lubricant, the lubricant being forced into the bearing under high pressure so as to insure its reaching all parts thereof. In this figure the reference character 36 indicates, as a whole, the knuckle of an automobile steering gear, to the upper end of which a grease cup, similar to that shown in Figs. 5 and 6, is secured by means of its screwthreaded tubular member 27ᵈ. I have described all of the grease cups shown in Figs. 1 to 6 inclusive as being provided with a pin 31 extending from both sides of the tubular members 28. This pin co-acts with the slot 37 in the coupling member 38 at the end of the flexible discharge nozzle 39 of the grease gun 40 to form a bayonet coupling. By this means the coupling member 38 at the end of the flexible discharge member 39 can be easily and quickly attached to and detached from the grease cups. The plunger of the grease gun 40 is provided with a screwthreaded piston rod which extends through the end 42 of the barrel of the grease gun and in screwthreaded engagement therewith. The piston rod 41 of the plunger can be rotated by means of the handle 43 so that the lubricant in the gun 40 can be placed under very high pressure.

By the above means lubricant is forced into each one of the grease cups through the tubular member 28ᵈ. As the springs 25 of each of the various modifications of my grease cup exert a pressure upon the plungers, these plungers will at first resist the entry of the lubricant to the cylinders 20 and the lubricant will consequently at first be forced through the screwthreaded tubular members 27 to the bearings. The bearings will then offer resistance to any further flow of the lubricant in that direction, and the pressure of the lubricant in the tubular members 27 and 28 will increase until it is sufficient to overcome the pressure of the springs 25, whereupon the plungers will be moved against the tension of the springs 25 until the cylinders 20 are sufficiently filled with lubricant. At this point the spiral springs will be compressed to such a degree that all of the coils or convolutions thereof will lie in the same plane and be supported by the ends 22 of the cylinders. The coils of the springs thus disposed will in turn act as a support for the plunger to hold it against any further motion toward the ends 21 of the cylinders. If the plunger in the gun 40 is then actuated to increase the pressure upon the lubricant, since the lubricant cannot find its way into the cylinder, it will necessarily be forced into the bearing and any pressure can be developed in the pump which is necessary to force the lubricant into all parts of the bearing.

After sufficient lubricant under high pressure has been discharged from the gun 40 to thoroughly lubricate all parts of the bearing the gun is detached, whereupon the ball-valves 30 are closed against their seats by the springs 32 and the lubricant is prevented from escaping from the tubular members 28. After the bearings have once received a thorough supply of lubricant sufficient lubricant can be fed thereto for sometime to keep them thoroughly lubricated with a very much smaller pressure than that initially employed for lubricating these bearings. This pressure is furnished by the springs 25 and the lubricant is slowly but continuously fed to the bearings by the plungers under the action of the springs 25. When the lubricant in the cylinders 20 is exhausted the grease gun is again connected with the members 28 and another supply of lubricant under high pressure is forced into the bearings to force out the old lubricant which may have become contaminated with dust and fine particles of comminuted metal.

In Fig. 8 I have illustrated an embodiment of my invention in which the wall of the cylinder 20ᵉ is formed of glass so that the amount of lubricant in the cylinder can be ascertained by merely looking through the wall of this cylinder. The end 22ᵉ of the cylinder has formed integrally therewith and extending upwardly therefrom a tubular member 28′ᵉ, the upper end of which is in substantially the same plane as the upper end of the cylinder 20ᵉ. The flanged end 21ᵉ of the cylinder rests upon the upper end of the cylinder and the upper end of the tubular member 28′ᵉ, and is clamped thereagainst by means of the tubular member 28ᵉ, the inner end of which has screwthreaded engagement with the upper end of the tubular member 28′ᵉ, as shown. In this modification the holes 45 at the lower end of the tubular member 28′ᵉ permit the lubricant to be forced into and out of the space between the end 22ᵉ and the plunger. A screwthreaded tubular member 27ᵉ provides a means for establishing communication between the cylinder and the bearing.

In Figs. 9, 10, and 11 I have disclosed a modification of my invention quite similar to that shown in Fig. 8 except that this construction embodies an inner glass cylinder 20ᶠ and an outer metal cylinder 20ᶠ which is formed integrally with the end 21ᶠ and has screwthreaded engagement with the flanged end 22ᶠ. The cylinder 20ᶠ is provided with slots 46 to permit the position of the plunger to be seen through the glass cylinder 20ᶠ.

Another modification of my invention is disclosed in Fig. 12 in which the cylinder 20ᵍ and the end 22ᵍ are formed integrally with each other, and the end 22ᵍ is provided with a screwthreaded opening for receiving the lower screwthreaded portion 27ᵍ of the tubular member 28ᵍ. Openings 45ᵍ are provided in the screwthreaded member 28ᵍ for the same purpose as the openings 45 in Figs. 8 and 9. In this figure the plunger is provided with an indicating pin 26ᵍ, similar to that shown in Fig. 5, which extends through a suitable opening in the end 21ᵍ of the cylinder.

In Fig. 13 the cylinder 20ʰ is formed integrally with the upper end 21ʰ and the tubular member 28ʰ, and in this construction the plunger is secured to the inner end of the screwthreaded tubular member 27ʰ. The spring 25ʰ bears against the lower side of the plunger and against the lower end 22ʰ which is held in place by the lugs 46. In this modification the lubricant occupies the space between the upper end of the cylinder and the plunger, and as the grease is gradually forced out of this space by the tension of the spring 25ʰ the cylinder 20ʰ moves downwardly over the screwthreaded tubular member 27ʰ. Consequently the displacement of the cylinder 20ʰ relative to the tubular member 27ʰ gives an indication of the amount of lubricant in the cylinder.

In Fig. 15 I have illustrated a further embodiment of my invention in which the cylinder 20ⁱ is formed integrally with the end 22ⁱ and the screwthreaded tubular member 27ⁱ, and the plunger is urged downwardly by the spring 26ⁱ, the upper end of which is confined by the upper end of the cylinder, which is in the form of inwardly extending lugs 21ⁱ. In this embodiment of my invention the tubular member 28ⁱ is secured directly to the plunger and moves therewith so that the relative displacement of the tubular member 28ⁱ and the cylinder 20ⁱ gives an indication of the amount of lubricant in the cylinder.

From the above descriptions of the various embodiments of my invention it will be clear that they each and all embody a cylinder having a plunger slidably mounted therein, a spring confined between one end of the cylinder and the plunger for urging the plunger toward the opposite end of the cylinder, a tubular member for supplying lubricant to the space between the face of the plunger opposite the spring and the adjacent end of the cylinder, and a second tubular member for conducting lubricant from this space to the bearing or surfaces to be lubricated, and also comprise means for indicating the amount of lubricant in the cylinder. At the beginning of a day's run the thumb nuts 26′ can be adjusted to limit the amount of lubricant which is to be fed to the bearings for the whole or a part of the day. Furthermore, in all forms of my invention the plungers, when the cylinders are completely filled with lubricant, are held against further movement by the ends of the cylinders so that the lubricant in the grease cups can be placed under pressure much higher than that of the tension of the springs, for the purpose described above.

While I have described the details of construction of the preferred embodiments of my invention, it is to be understood that my invention is not limited to these details, but is capable of other adaptations and modifications within the scope of the appended claims. It should also be understood that the words "upper" and "lower" as used throughout the specification are merely relative and not absolute terms of description as my improved lubricating system and grease cups will operate satisfactorily in any position.

Having thus described my invention what I claim is:

1. A lubricating system comprising a cylinder, a plunger in said cylinder, a spiral spring between said plunger and one end of said cylinder, means for establishing communication between the other end of said cylinder and the bearing comprising a tubular member, means for supplying lubricant to the last named end of said cylinder comprising a second tubular member having an outwardly closing closure, a lubricant pump, and co-acting means on said lubricant pump and on said tubular member for detachably connecting said lubricant pump and said second tubular member to deliver lubricant to said cylinder under pressure greater than the pressure of said spring, the first mentioned end of said cylinder acting as a support for said plunger when lubricant is forced into said cylinder under a pressure greater than the tension of said spring.

2. A lubricating system comprising a cylinder, a plunger in said cylinder, a spiral spring between said plunger and one end of said cylinder, means for establishing communication between the other end of said cylinder and the bearing, means for supplying lubricant to the last named end of said cylinder comprising a second tubular member having an outwardly closing closure, a lubricant pump, and means for detachably connecting said lubricant pump and said second tubular member to deliver lubricant to said cylinder under pressure greater than the pressure of said spring, the first mentioned end of said cylinder acting as a support for said plunger when lubricant is forced into said cylinder under a pressure greater than the tension of said spring.

3. A lubricating system comprising a cylinder, a plunger in said cylinder, a spring between said plunger and one end of said cylinder, means for establishing communication between the other end of said cylinder and the bearing, means for supplying lubricant to the last named end of said cylinder comprising a second tubular member having an outwardly closing closure, a lubricant pump, and means for detachably connecting said lubricant pump and said second tubular member to deliver lubricant to said cylinder under pressure greater than the pressure of said spring.

4. A lubricating system comprising a cylinder, a plunger in said cylinder, a spring between one end of said cylinder and the adjacent face of said plunger, means for establishing communication between the surfaces to be lubricated and the space between the other end of said cylinder and the other face of said cylinder, and means for supplying lubricant to said space under pressure considerably greater than the pressure of said spring comprising a tubular member having an outwardly closing closure and a lubricant pump detachably connected therewith.

5. A lubricating system comprising a receptacle for receiving lubricant, means for conducting lubricant from said receptacle to the surfaces to be lubricated, means for supplying lubricant to said receptacle under an initially high pressure sufficient to force the lubricant between the surfaces to be lubricated, and means for subsequently maintaining the lubricant in said receptacle under a substantially constant lower pressure.

6. A lubricating system comprising a receptacle for receiving lubricant, means for conducting lubricant from said receptacle to the surfaces to be lubricated, means for supplying lubricant to said receptacle under an initially high pressure sufficient to force the lubricant between the surfaces to be lubricated, and means for subsequently maintaining the lubricant in said receptacle under a lower pressure.

7. A lubricating system comprising a lubricant receptacle, means for subjecting the lubricant in said receptacle to pressure, and means detachably connected to said receptacle for first filling said lubricant receptacle and energizing said first named means and for then placing the lubricant in said receptacle under a higher pressure, sufficient to dislodge contaminated, used lubricant from the bearing supplied with lubricant from said receptacle, and thereby enabling said pressure means to continue the supply of lubricant to said bearing.

8. The combination with a lubricant receptacle having a spring pressed plunger for maintaining pressure on the lubricant, of means for conducting lubricant from said receptacle to a bearing, a conduit for supplying lubricant to said receptacle, an outwardly closing closure for said conduit, a lubricant compressor for supplying lubricant to said receptacle at a pressure greater than the pressure of said spring, and means for detachably connecting the discharge conduit of said lubricant compressor with said second-named conduit.

In witness whereof I hereunto subscribe my name this 14th day of November, A. D. 1918.

DOUGLAS F. FESLER.

Witnesses:
EDNA V. GUSTAFSON,
FAE PETRIE.